United States Patent
Chen et al.

(10) Patent No.: US 11,625,248 B2
(45) Date of Patent: Apr. 11, 2023

(54) OPERATOR REGISTRATION METHOD AND APPARATUS FOR DEEP LEARNING FRAMEWORK, DEVICE AND STORAGE MEDIUM

(71) Applicant: BEIJING BAIDU NETCOM SCIENCE TECHNOLOGY CO., LTD., Beijing (CN)

(72) Inventors: Weihang Chen, Beijing (CN); Jiabin Yang, Beijing (CN); Hongyu Liu, Beijing (CN); Xiang Lan, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/572,140

(22) Filed: Jan. 10, 2022

(65) Prior Publication Data
US 2022/0374238 A1    Nov. 24, 2022

(30) Foreign Application Priority Data
May 18, 2021    (CN) .......................... 202110540476.4

(51) Int. Cl.
*G06F 9/44*        (2018.01)
*G06F 9/38*        (2018.01)
(Continued)

(52) U.S. Cl.
CPC ............ *G06F 9/3828* (2013.01); *G06F 8/443* (2013.01); *G06F 8/51* (2013.01); *G06F 9/30098* (2013.01); *G06F 9/545* (2013.01)

(58) Field of Classification Search
None
See application file for complete search history.

(56) References Cited

U.S. PATENT DOCUMENTS 9,836,692 B1 * 12/2017 Gulland ................... G06N 3/08
11,216,752 B1 * 1/2022 Welsh ........................ G06F 8/35
(Continued)

FOREIGN PATENT DOCUMENTS

| CN | 107463595 A | 12/2017 |
|---|---|---|
| CN | 110795104 A | 2/2020 |

(Continued)

OTHER PUBLICATIONS

Search Report of Chinese application No. 2021105404764 dated Nov. 18, 2021, 2 pages.

*Primary Examiner* — Qamrun Nahar
(74) *Attorney, Agent, or Firm* — Brooks Kushman P.C.

(57) ABSTRACT

The present disclosure provides an operator registration method and apparatus for a deep learning framework, a device and a storage medium, relates to the field of computer technologies, and specifically to the field of artificial intelligence such as deep learning. The operator registration method for a deep learning framework includes: receiving registration information provided by a user for registering operators with the deep learning framework, the registration information including: a custom calculation function, the custom calculation function being written in a manner irrelevant to the deep learning framework; building operator meta-information in the deep learning framework based on the registration information; and constructing a to-be-registered operator within the deep learning framework based on the operator meta-information, and registering the to-be-registered operator in a global operator table within the deep learning framework. The present disclosure can simplify an operator registration process.

20 Claims, 5 Drawing Sheets

(51) Int. Cl.
    *G06F 9/30*            (2018.01)
    *G06F 9/54*            (2006.01)
    *G06F 8/41*            (2018.01)
    *G06F 8/51*            (2018.01)

(56) References Cited

U.S. PATENT DOCUMENTS

| | | | |
|---|---|---|---|
| 2014/0337269 A1 | 11/2014 | Eads | |
| 2019/0114142 A1* | 4/2019 | Yoda | G06F 9/30014 |
| 2020/0150958 A1* | 5/2020 | Ahmed | G06F 9/30145 |
| 2021/0350234 A1* | 11/2021 | Yao | G06N 3/08 |
| 2022/0129254 A1* | 4/2022 | Chang | G06F 8/443 |

FOREIGN PATENT DOCUMENTS

| | | | |
|---|---|---|---|
| CN | 111782219 A | 10/2020 |
| CN | 111783124 A | 10/2020 |
| CN | 112069456 A | 12/2020 |
| CN | 112270399 A | 1/2021 |
| CN | 112558942 A | 3/2021 |
| CN | 112561084 A | 3/2021 |

* cited by examiner

OPERATOR REGISTRATION METHOD AND APPARATUS FOR DEEP LEARNING FRAMEWORK, DEVICE AND STORAGE MEDIUM

CROSS-REFERENCE TO RELATED APPLICATIONS

The present application claims the priority of Chinese Patent Application No. 202110540476.4, filed on May 18, 2021, with the title of "OPERATOR REGISTRATION METHOD AND APPARATUS FOR DEEP LEARNING FRAMEWORK, DEVICE AND STORAGE MEDIUM." The disclosure of the above application is incorporated herein by reference in its entirety.

TECHNICAL FIELD

The present disclosure relates to the field of computer technologies, specifically to the field of artificial intelligence such as deep learning, and in particular, to an operator registration method and apparatus for a deep learning framework, a device and a storage medium.

BACKGROUND

As a basic framework in the field of artificial intelligence, a deep learning framework has gradually attracted more and more attention. One of its important indicators is scalability of the framework, and a custom operator is a main way to achieve scalability.

In the related art, in order to implement user-defined operators and apply them to the deep learning frameworks, users are generally required to understand internal concepts of the deep learning framework, inherit inner classes, and even compile the entire deep learning framework.

SUMMARY

The present disclosure provides an operator registration method and apparatus for a deep learning framework, a device and a storage medium.

According to one aspect of the present disclosure, an operator registration method for a deep learning framework is provided, including: receiving registration information provided by a user for registering operators with the deep learning framework, the registration information including: a custom calculation function, the custom calculation function being written in a manner irrelevant to the deep learning framework; building operator meta-information in the deep learning framework based on the registration information; and constructing a to-be-registered operator within the deep learning framework based on the operator meta-information, and registering the to-be-registered operator in a global operator table within the deep learning framework.

According to another aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform an operator registration method for a deep learning framework, wherein the method includes: receiving registration information provided by a user for registering operators with the deep learning framework, the registration information including: a custom calculation function, the custom calculation function being written in a manner irrelevant to the deep learning framework; building operator meta-information in the deep learning framework based on the registration information; and constructing a to-be-registered operator within the deep learning framework based on the operator meta-information, and registering the to-be-registered operator in a global operator table within the deep learning framework.

According to another aspect of the present disclosure, there is provided a non-transitory computer readable storage medium with computer instructions stored thereon, wherein the computer instructions are used for causing a computer to perform an operator registration method for a deep learning framework, wherein the method includes: receiving registration information provided by a user for registering operators with the deep learning framework, the registration information comprising: a custom calculation function, the custom calculation function being written in a manner irrelevant to the deep learning framework; building operator meta-information in the deep learning framework based on the registration information; and constructing a to-be-registered operator within the deep learning framework based on the operator meta-information, and registering the to-be-registered operator in a global operator table within the deep learning framework.

An operator registration process can be simplified according to the technical solution of the present disclosure.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF THE DRAWINGS

The accompanying drawings are intended to provide a better understanding of the solutions and do not constitute a limitation on the present disclosure. In the drawings.

DETAILED DESCRIPTION

Figure 1:
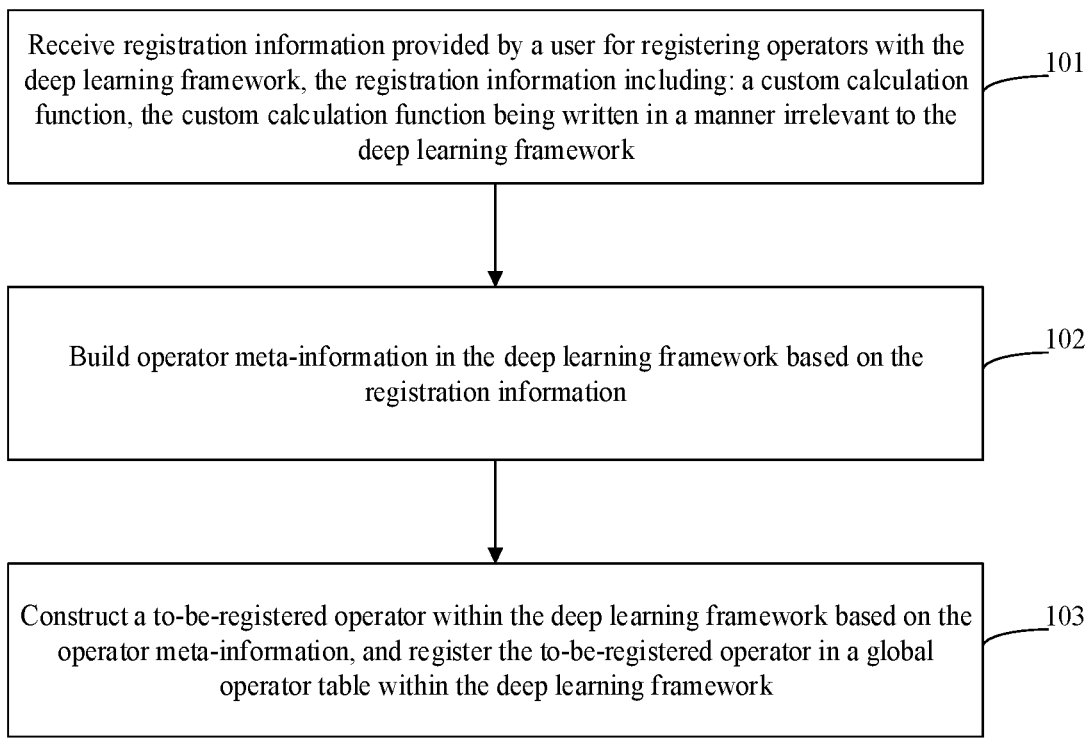
FIG. 1 is a schematic diagram of a first embodiment according to the present disclosure.

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Operators are basic calculation units in a deep learning framework (referred to as "framework"), with input including tensors or combinations of tensors, and complete specific functions through calculation on the tensors or combinations of tensors, such as convolution operators, pooling operators and relu operators. In the deep learning framework, tensors are used to represent data, and the tensors may be interpreted as a multidimensional array. A process of building a model by using the deep learning framework is also a process of combining different operators to meet a specific calculation objective, and the richness of operators is also an important indicator to measure completeness of functionality of deep learning framework products. Many customized operators combined by non-generic and non-basic operators are required in some specific fields, for example, models in 3D vision and optical flow fields. In this case, a custom operator function of the framework is required to be used to expand and develop the framework, so that the framework can be used in specific fields.

If custom operators of the deep learning framework are written in an excessively complex method and have excessive concepts to be understood, it is difficult for many users to write usable custom operators. Therefore, for a deep learning framework product, it is extremely important to provide a simple custom operator processing scheme.

In order to apply the custom operators to the deep learning framework, the following steps are generally required to be completed.

(1) Implement a calculation logic of an operator: In the step, a core calculation logic of the operator is written using C++. In the implementation of the part, whether a data structure inside a tensor-independent framework is required to be understood is the key to conciseness.

(2) Associate the operator with the framework: In the step, the calculation logic of the operator is registered or associated with the framework in such a way that it can be called by the framework. This also requires a more intuitive writing manner, without introduction of difficult-to-understand concepts.

(3) Compile the operator and use the operator in a model: In the step, the operator is required to be compiled so that it can be applied to a real scenario. Whether the whole framework is required to be compiled jointly is one of the important indicators to measure the conciseness of the step. There is a significant difference in convenience between users' writing their own operators independently and compiling the whole framework jointly by downloading complete framework code.

In the related art, the deep learning framework products have their own custom operator writing schemes, but are uneven in terms of ease of use of the schemes, and all introduce concepts within the frameworks, which increases the users' costs of understanding. Brief introduction is provided as follows.

(1) In a "PyTorch scheme", a calculation function is written with tensors as input and returns a tensor list, is packaged, by using a Pybind11 module, as a Python interface for independent compilation, then inherits Function within its framework, performs forward and backward methods, and uses context to associate forward and backward execution logics.

(2) A "TensorFlow scheme" is basically the same as the method for writing its internal operator, in which OpKernel at the bottom of the framework is inherited, a Compute scheme specified by the framework is implemented, OpKernelContext at the bottom of the framework is used to manage input and output, registration is completed by using a plurality of registration interfaces at the bottom of the framework, and independent compilation is supported.

(3) A "MindSpore scheme" is exactly the same as the method for writing its internal operator, in which underlying framework concepts such as PrimitiveWithInfer and GPUKernel are required to be understood and inherited, Init and launch methods specified by the framework are implemented, and registration is completed according to a specific writing method, which has to be compiled together with the full framework source code.

(4) In a "Jittor scheme", CustomOp at the bottom of the framework is required to be understood and inherited, jit_prepare and jit_run methods specified by the framework are implemented, and the operator is packaged into a character string for immediate use after compilation.

In order to make a more intuitive comparison between the related art and the present disclosure, comparisons between the related art and the present disclosure may be shown in Table 1.

TABLE 1

| Dependency | PyTorch | Tensorflow | MindSpore | Jittor | The present disclosure |
|---|---|---|---|---|---|
| Do calculation functions have to be written | Yes | Yes | Yes | Yes | Yes |
| Do internal concepts have to be understood | Yes | Yes | Yes | Yes | |
| Do inner classes have to be inherited | Yes | Yes | Yes | Yes | |
| Does the whole framework have to be compiled | | | | Yes | |

Table 1 shows comparisons between the related art and the present disclosure in terms of dependencies. The fewer the dependencies, the simpler the scheme. The present disclosure focuses on the nature of operator computation and greatly simplifies the registration processing scheme for custom operators, or simplifies programming paradigms for custom operators.

Specific implementation solutions of the present disclosure may be obtained with reference to the following embodiments.

FIG. 1 is a schematic diagram of a first embodiment according to the present disclosure. This embodiment provides an operator registration method for a deep learning framework, the method including the following steps.

In 101, registration information provided by a user for registering operators with the deep learning framework is received. The registration information including: a custom calculation function, the custom calculation function being written in a manner irrelevant to the deep learning framework.

In 102, operator meta-information in the deep learning framework is built based on the registration information.

In 103, a to-be-registered operator within the deep learning framework is constructed based on the operator meta-information, and the to-be-registered operator is registered in a global operator table within the deep learning framework.

Figure 2:
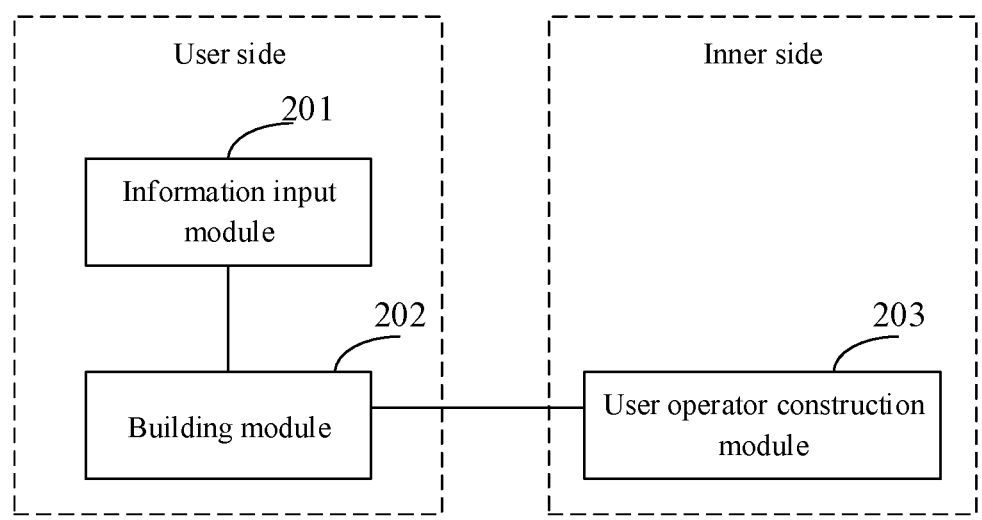
FIG. 2 is a schematic diagram of a second embodiment according to the present disclosure.

The processing method according to this embodiment may be performed by a deep learning framework. As shown in FIG. 2, the deep learning framework may be divided into a user side and an internal side. On the user side, an information input module 201 may be included. A user may input the above registration information through the information input module 201. Specifically, in the deep learning framework, a registration interface may be pre-designed and taken as an information input module to realize input of the registration information. The registration interface may be implemented with macros, static objects, methods, or the like.

The registration information includes: a custom calculation function. Further, the registration information may further include: custom input information and custom output information. The custom input information and the custom output information refer to information about an input variable of a custom operator and information about an output variable of the custom operator respectively. The information is, for example, a variable name. Taking the custom input information as an example, the custom input information is, for example, a name of the input variable named by the user. More specifically, for example, if an input variable is a tensor, it may be named tensor1. Since the registration information includes custom information, it may be understood as the registration information of the custom operator.

Operators are basic calculation units in the deep learning framework, including calculation functions. More specifically, an operator may include a forward function and a backward function.

In the custom operator, the calculation function is written by the user himself/herself, that is, the custom calculation function.

"The custom calculation function is irrelevant to the deep learning framework" means that the user is neither required to understand internal concepts of the deep learning framework, nor required to inherit inner classes of the deep learning framework, and the user may write the calculation function in a concise, flexible and intuitive way.

The calculation function is concise, flexible and intuitive in the following aspects.

(1) There is no restriction on function naming, and the user is not required to implement a specified function. The user may name his/her own function at will.

(2) A number of function parameters is not limited, and the user may take one or more Tensors, vector<Tensor>, and int-, float- and double-type parameters as input according to actual calculation requirements, which is very flexible.

(3) A function return value is a variable Tensor list. The user may return one or more Tensors according to actual calculation requirements.

(4) The user is required only to understand basic concepts necessary for an operator calculation logic, including basic data type Tensor, data types and device types, without the need to understand other underlying framework concepts, which has low costs of learning and understanding.

Based on the above features, the calculation function of the custom operator may be written in a following manner:

```
return a Tensor list a name of the calculation function of the operator
(input Tensor1, input Tensor2 ...){
    operator calculation logic ...
    return calculation results
}
```

For the custom operator, a forward function and a backward function of the custom operator may be generally written, and the two functions may be implemented in the above intuitive, programmatic, and concise manner.

In the programming paradigm design, the user is required only to pay close attention to inputted Tensor and returned Tensor and the implementation of the related calculation logic, without the need to focus on irrelevant concepts inside the framework, such as OpKernelContext, CustomOp and OpKernel. This conforms to general programming conventions and has low costs in understanding of writing.

Through the custom calculation function irrelevant to the deep learning framework written by the user, the user can write the calculation function of the custom operator in a concise, flexible and intuitive way, thereby simplifying the operator registration process.

After the registration information entered by the user is received, operator meta-information (OpMetaInfo) may be generated based on the registration information. As shown in FIG. 2, on the user side, a building module 202 may be further included. The building module 202 is configured to build operator meta-information (OpMetaInfo) corresponding to the custom operator based on the registration information. Further, each custom operator corresponds to a piece of operator meta-information, a plurality of custom operators correspond to a plurality of pieces of operator meta-information, and the plurality of pieces of operator meta-information may form an operator meta-information map (OpMetaInfoMap).

Specifically, the operator meta-information may be built based on the registration information by using a builder. The builder may use, for example, macros.

In some embodiments, the step of building operator meta-information in the deep learning framework based on the registration information may include: converting the custom input information into standard input information within the deep learning framework; converting the custom output information into standard output information within the deep learning framework; processing the custom calculation function by using macros, so as to obtain a calculation function after macro processing; and building the operator meta-information in the deep learning framework based on the standard input information, the standard output information and the calculation function after macro processing.

In an example where the input information or output information is a variable name, a custom input variable name may be converted into a standard input variable name, and a custom output variable name may be converted into a standard output variable name Taking input as an example, a mapping relation between custom input variable names and standard input variable names may be pre-configured in the deep learning framework, so as to convert a custom input variable name into a standard input variable name through the mapping relation. For example, if the custom input variable name is input Tensor1, it may be converted into a standard input variable name X after processing by the pre-configured mapping relation. It may be understood that the mapping relation is not limited to a one-to-one correspondence relation between one specific name and another specific name, which may also be a calculation relation or processing relation, so as to convert custom variable names into standard variable names conforming to the deep learning framework. Variable names include input variable names and output variable names.

The "processing the custom calculation function by using macros" may mean wrapping the custom calculation function with macros. For example, if the custom calculation function is ReluCPUForward and the macro is PD_KERNEL, a calculation function after macro processing may be expressed as PD_KERNEL(ReluCPUForward).

In the field of computers, a macro is a substitution processing, which can be realized through a defined substitution relation. For example, through the defined substitution relation, the calculation function after macro processing, PD_KERNEL(ReluCPUForward), is substituted with a calculation function compute included in a set structure KernelFuncImp1.

Based on the above defined substitution relation, compiling a custom function may be substituted with by processing a Compute function of KernelFuncImp1.

The built operator meta-information may include: standard input information, standard output information, and a function pointer of the calculation function after macro processing.

The operator meta-information corresponding to the custom operator may be efficiently built through the above conversion and macro processing.

In some embodiments, the to-be-registered operator includes to-be-registered operator description information and a to-be-registered operator kernel function, and the step of constructing a to-be-registered operator within the deep learning framework based on the operator meta-information includes: constructing the to-be-registered operator description information based on the standard input information and the standard output information; and constructing the to-be-registered operator kernel function based on the calculation function after macro processing.

As shown in FIG. 2, on the internal side, a user operator construction module 203 may be included, configured to construct a to-be-registered operator within the deep learning framework based on the operator meta-information, and register the to-be-registered operator in a global operator table within the deep learning framework. In order to be distinguished from the operator existing in the deep learning framework, the to-be-registered operator corresponding to the custom operator written by the user may be referred to as a user operator (CustomOp). It may be understood that the user operator is a standard operator conforming to the deep learning framework and may be uniformly scheduled within the deep learning framework.

In the deep learning framework, the operator may include two parts: description information and a kernel function. The description information includes, for example, input information and output information. The kernel function is configured to describe the main calculation logic of the operator.

The to-be-registered operator description information may include: standard input information, standard output information.

The to-be-registered operator kernel function may be constructed based on the calculation function after macro processing.

The to-be-registered operator kernel function is constructed based on the calculation function after macro processing, so that the custom calculation function may be associated with a standard calculation function, so as to apply the custom operator to the deep learning framework.

Within the deep learning framework, in order to realize unified scheduling, functions corresponding to operators in the deep learning framework are written in a unified method, and the unified writing method is quite different from the manner of writing the calculation function of the custom operator of the user.

Specifically, in different scenarios, calculation functions written by different users may be different. For example, when a tensor is used as input, the function is written as:

return a Tensor list a name of the calculation function of the operator (input Tensor1) { . . . }

If there are two input tensors, the function is written as:

return a Tensor list a name of the calculation function of the operator (input Tensor1, input Tensor2){ . . . }

When there are more inputs, there are more methods to write functions. In the C++ programming language, different function writing methods mean different function pointer types, that is, different data types. Function pointer types possibly written by the user are required to be stored in the framework and called at the bottom of the framework. Such a paradigm of great flexibility in writing cannot be stored in a concise and generic form in the C++ programming language. In order to achieve overall conciseness, various calculation functions written by the user are further required to be unified.

For example, one custom calculation function has the following function form:

return a Tensor list a name of the calculation function of the operator (input Tensor1) { . . . }

For example, one custom calculation function has the following function form:

return a Tensor list a name of the calculation function of the operator (input Tensor1, input Tensor2){ . . . }

The function forms of the above two custom calculation functions are not unified. In this embodiment, different custom calculation functions are required to be unified, so as to facilitate unified scheduling within the deep learning framework.

A unified function, that is, a function in the unified form, may have the following function form:

return a Tensor list a name of the calculation function of the operator (input a Tensor list){ . . . }

In some embodiments, the to-be-registered operator kernel function includes unified-form input information and a unified function pointer, and the step of constructing the to-be-registered operator kernel function based on the calculation function after macro processing includes: determining a structure for replacing the calculation function after macro processing, the structure including a static function, the static function having a unified form corresponding to different custom calculation functions; taking input information of the static function as the unified-form input information; and taking a function pointer of the static function as the unified function pointer.

For example, in general, operators in a framework are required to inherit an OpKernel class and fill in and implement their own Compute functions. Corresponding input and output tensors are in the context and are required to be obtained by Input and Output methods of the context. This is fundamentally different from the previous intuitive programming paradigm of custom calculation functions, so the two are required to be associated.

In this embodiment, the to-be-registered operator kernel function may be constructed based on a unified-form function. The unified-form function may be a static function in a predefined structure.

Specifically, in this embodiment, the constructing the to-be-registered operator kernel function may include: building input information of the static function, building a function pointer of the static information, and building some other standard processing, for example, acquiring input information from a context and placing the input information into an inputs variable.

In this embodiment, the constructing the to-be-registered operator kernel function may include the above three building processes.

The to-be-registered operator kernel function is constructed using a static function having a unified form, so that the custom calculation functions can be unified to facilitate unified scheduling of the deep learning framework.

Input of the static function having a unified form may be an input variable list. Further, the input variable list may include an input tensor list and an attribute list. The attribute list is configured to store input variables of other data types. For example, input variables of the custom calculation functions include tensor, int and float data types, which are expressed as tensor1, tensor2, int and float, and then the input variable list of the static function may include a tensor list (tensor1, tensor2) and an attribute list (int, float).

The input variable list may be obtained using a template parameter derivation mechanism of C++.

In some embodiments, the input information of the static function forms an input information list, the input information list includes an input tensor list, the custom input information includes custom input information of at least one data type, the structure includes at least one specialized substructure, different specialized substructures correspond to different data types, the data type includes tensors, and the step of constructing the to-be-registered operator kernel function based on the calculation function after macro processing further includes: obtaining custom input information of the data types corresponding to the specialized substructures by using specialized substructures in the at least one specialized substructure; forming the input tensor list with the custom input information whose data type are tensors; and if the data type further includes non-tensors and the input information list further includes another data type list, forming the another data type list with the custom input information whose data type are non-tensors.

Specifically, when a custom operator is compiled, a structure (struct) configured to substitute the calculation function after macro processing may be determined based on a substitution relation of a defined macro. Based on the above example, the calculation function after macro processing is PD_KERNEL(ReluCPUForward), the structure configured to substitute the function is KernelFuncImpl, and the static function in the structure is Compute. In practical application, a pointer to the static function Compute may be returned. Further, the structure KernelFuncImpl may further include a plurality of specialized substructures. The substructures refer to structures included in the structure KernelFuncImpl. The specialized substructures refer to the structures in which one or more parameters are reified. In this embodiment, different specialized substructures correspond to different data types. For example, if a first template parameter of a specialized substructure is reified as a tensor type, a data type corresponding to the specialized substructure is a tensor, and the input variables whose data types are tensors in the custom calculation function may be analyzed. The static function Compute may be called through a pointer of the static function Compute based on the specialized substructure. Return results of the static function Compute are function pointers of the static functions in specialized substructures in the plurality of specialized substructures. If the static functions in the specialized substructures are represented with, for example, ComputeCallHelper1, ComputeCallHelper2 . . . , through the calling of the static function Compute, a function pointer of ComputeCallHelper1 may be returned, a function pointer of ComputeCallHelper2 may be returned, and so on. The static function in the corresponding specialized substructure may be then called based on the function pointer. For example, ComputeCallHelper1 is called based on the function pointer of ComputeCallHelper1. The static functions in the specialized substructures are configured to analyze input variables of the corresponding data types and construct a list of the input variables of the corresponding data types. For example, if the data type corresponding to ComputeCallHelper1 is a tensor and the input variables of the custom calculation function include tensor1 and tensor2, an input tensor list (tensor1, tensor2) may be acquired through execution of ComputeCallHelper1.

Figure 3:
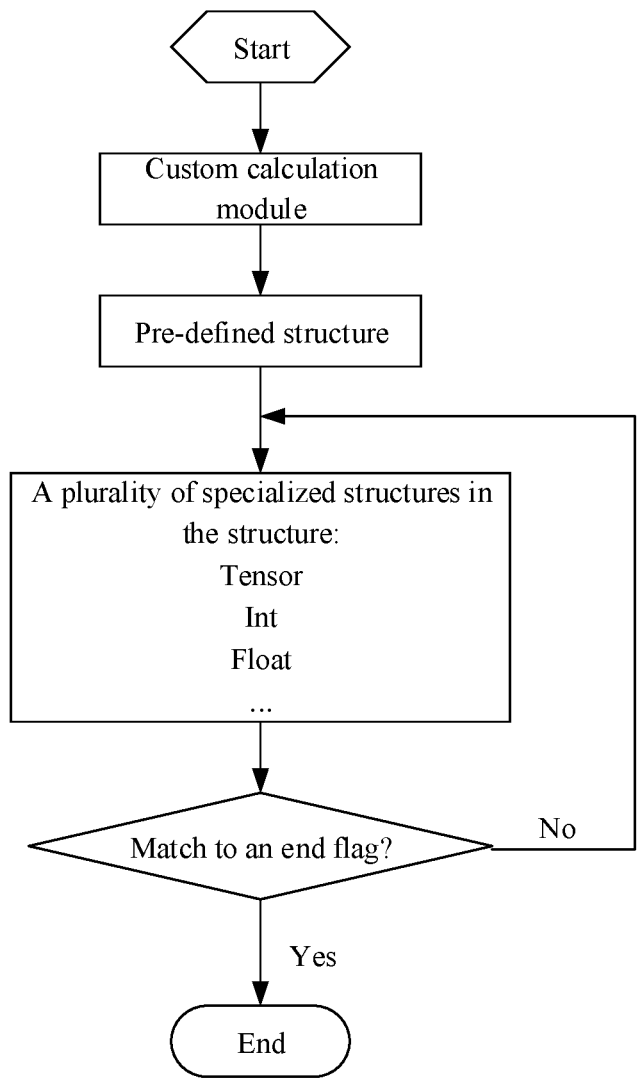
FIG. 3 is a schematic diagram of a third embodiment according to the present disclosure.

In specific implementation, as shown in FIG. 3, the input variables of the corresponding data types can be obtained and form a corresponding input variable list by matching different specialized substructures with the input variables of the custom calculation function one by one. In addition, a special specialized substructure may also be included to mark the end of the matching. Further, when the input variables of the custom computed function are analyzed using the specialized substructures, the template derivation mechanism of C++ may be used.

The input variables of the custom calculation function may be analyzed through a predefined structure.

In some embodiments, a current constructor corresponding to a current scenario may be determined based on the current scenario; and the to-be-registered operator within the deep learning framework may be constructed based on the operator meta-information by using the current constructor, and the to-be-registered operator is registered in the global operator table within the deep learning framework.

Figure 4:
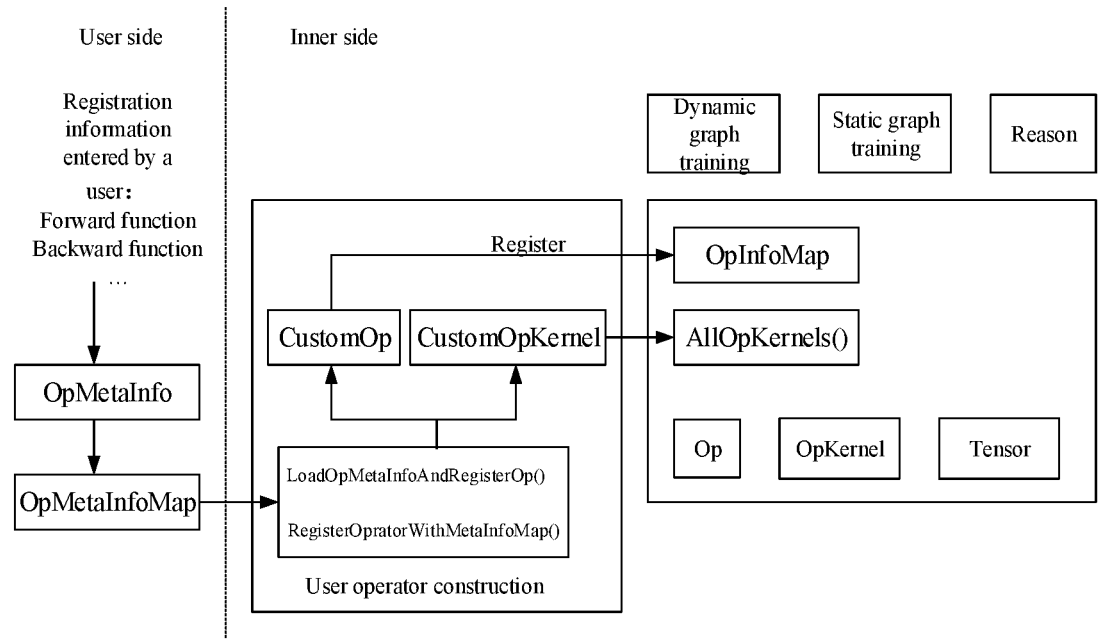
FIG. 4 is a schematic diagram of a fourth embodiment according to the present disclosure.

As shown in FIG. 4, two types of constructors may exist, which are represented with LoadOpMetaInfoAndRegister( )(load for short) and RegisterOperatorWithMetaInfoMap( )(register for short) respectively.

The current constructor may be selected according to the current scenario. For example, if the current scenario is training, the current constructor selected is load. If the current scenario is reasoning, the current constructor selected is register. The "load" refers to a process of first compiling and generating a dynamic library file, exiting after the generation of the dynamic library file, loading the dynamic library in the case of a restart, and completing registration, in which generation and registration are two processes. "register" is a process of generation and registration. In addition, CustomOp and CustomOpKernel in FIG. 4 refer to two classes of the to-be-registered operator corresponding to the custom operator, which are configured to store the to-be-registered operator description information and the to-be-registered operator kernel function respectively. OpinfoMap and AllOpKernels( ) global operator tables, configured to store global operator description information and operator kernel functions respectively.

Specifically, the registration information entered by the user may be stored in OpMetaInfo, and a plurality of pieces of OpMetaInfo may form OpMetaInfoMap. When compiling a custom operator, the user may call the load function or register function to construct a to-be-registered operator corresponding to the custom operator and register it in the global operator table. Then, scheduling may be performed based on a unified scheduling manner of the deep learning framework. For training, the user may perform calling using a Python interface. When generating the Python interface, the deep learning framework may encapsulate the calling of the load function in the Python interface. Therefore, automatic calling is enabled when the user uses the Python interface. For reasoning, when a reasoning program is started, global calling may be performed once, so as to call the register function.

Different constructors are used in different scenarios, which can enable more flexible implementation.

In the embodiment of the present disclosure, through the above processing, encoding complexity of custom operators in the deep learning framework is effectively reduced, costs of secondary development of the framework are reduced, and ease of use of the framework is improved, which facilitates other professional fields to conveniently extend special operators through the method, and to use the deep learning framework to conduct AI research in fields such as quantum computing and biological computing. This has a long-term positive impact on the construction of an ecosystem of deep learning frameworks and improves competitiveness.

Figure 5:
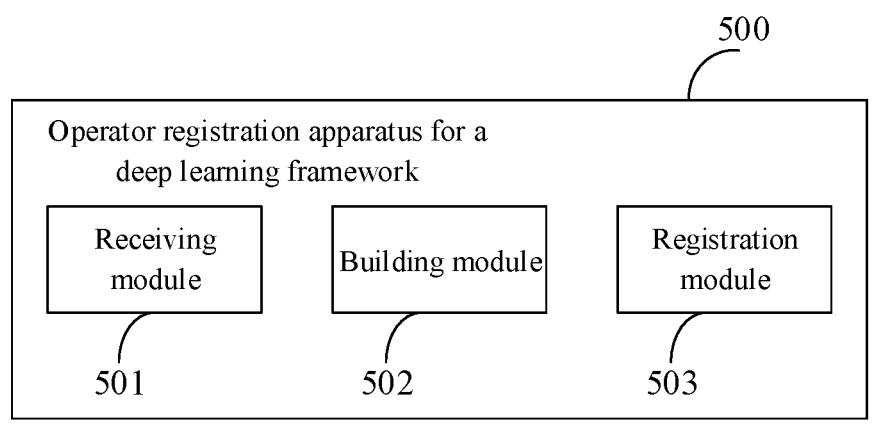
FIG. 5 is a schematic diagram of a fifth embodiment according to the present disclosure.

FIG. 5 is a schematic diagram of a fifth embodiment according to the present disclosure. This embodiment provides an operator registration apparatus for a deep learning framework. As shown in FIG. 5, the operator registration apparatus 500 includes: a receiving module 501, a building module 502 and a registration module 503.

The receiving module 501 is configured to receive registration information provided by a user for registering operators with the deep learning framework, the registration information including: a custom calculation function, the custom calculation function being written in a manner irrelevant to the deep learning framework. The building module 502 is configured to build operator meta-information in the deep learning framework based on the registration information. The registration module 503 is configured to construct a to-be-registered operator within the deep learning framework based on the operator meta-information, and register the to-be-registered operator in a global operator table within the deep learning framework.

In some embodiments, the registration information further includes: custom input information and custom output information, and the building module 502 is specifically configured to: convert the custom input information into standard input information within the deep learning framework; convert the custom output information into standard output information within the deep learning framework; process the custom calculation function by using macros, so as to obtain a calculation function after macro processing; and build the operator meta-information in the deep learning framework based on the standard input information, the standard output information and the calculation function after macro processing.

In some embodiments, the to-be-registered operator includes to-be-registered operator description information and a to-be-registered operator kernel function, and the registration module 503 is specifically configured to: construct the to-be-registered operator description information based on the standard input information and the standard output information; and construct the to-be-registered operator kernel function based on the calculation function after macro processing.

In some embodiments, the to-be-registered operator kernel function includes unified-form input information and a unified function pointer, and the registration module 503 is further specifically configured to: determine a structure for replacing the calculation function after macro processing, the structure including a static function, the static function having a unified form corresponding to different custom calculation functions; take input information of the static function as the unified-form input information; and take a function pointer of the static function as the unified function pointer.

In some embodiments, the input information of the static function forms an input information list, the input information list includes an input tensor list, the custom input information includes custom input information of at least one data type, the structure includes at least one specialized substructure, different specialized substructures correspond to different data types, the data type includes tensors, and the registration module is further configured to: obtain custom input information of the data types corresponding to the specialized substructures by using specialized substructures in the at least one specialized substructure; form the input tensor list with the custom input information whose data type are tensors; and if the data type further includes non-tensors and the input information list further includes another data type list, form the another data type list with the custom input information whose data type are non-tensors.

In some embodiments, the registration module 503 is specifically configured to: determine a current constructor corresponding to a current scenario based on the current scenario; and construct the to-be-registered operator within the deep learning framework based on the operator meta-information by using the current constructor, and register the to-be-registered operator in the global operator table within the deep learning framework.

It may be understood that the same or similar contents in different embodiments may be referred to each other in the embodiments of the present disclosure.

It may be understood that "first", "second" and the like in the embodiments of the present disclosure are intended only for differentiation, and do not indicate a degree of importance or sequence.

According to embodiments of the present disclosure, the present disclosure further provides an electronic device, a readable storage medium and a computer program product.

Figure 6:
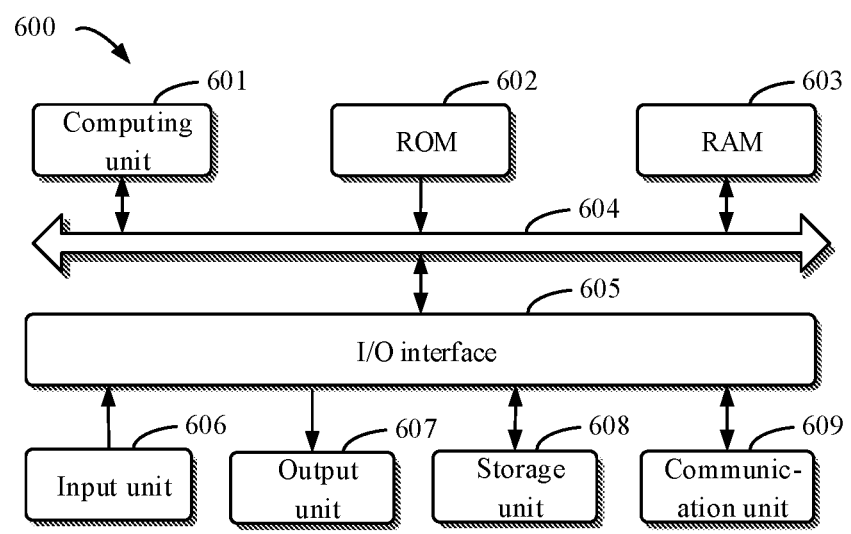
FIG. 6 is a schematic diagram of an electronic device configured to perform any one of the operator registration methods for a deep learning framework according to embodiments of the present disclosure.

FIG. 6 is a schematic block diagram of an exemplary electronic device 600 that can be configured to implement embodiments of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 6, the electronic device 600 includes a computing unit 601, which may perform various suitable actions and processing according to a computer program stored in a read-only memory (ROM) 602 or a computer program loaded from a storage unit 606 into a random access memory (RAM) 603. The RAM 603 may also store various programs and data required to operate the electronic device 600. The computing unit 601, the ROM 602 and the RAM 603 are connected to one another by a bus 604. An input/output (I/O) interface 605 may also be connected to the bus 604.

A plurality of components in the electronic device 600 are connected to the I/O interface 605, including an input unit 606, such as a keyboard and a mouse; an output unit 607, such as various displays and speakers; a storage unit 608, such as disks and discs; and a communication unit 609, such as a network card, a modem and a wireless communication transceiver. The communication unit 609 allows the electronic device 600 to exchange information/data with other devices over computer networks such as the Internet and/or various telecommunications networks.

The computing unit 601 may be a variety of general-purpose and/or special-purpose processing components with processing and computing capabilities. Some examples of the computing unit 601 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or macro-controller, etc. The computing unit 601 performs the methods and processing described above, such as the operator registration method for a deep learning framework. For example, in some embodiments, the operator registration method for a deep learning framework may be implemented as a computer software program that is tangibly embodied in a machine-readable medium, such as the storage unit 608. In some embodiments, part or all of a computer program may be loaded and/or installed on the device 600 via the ROM 602 and/or the communication unit 609. One or more steps of the operator registration method for a deep learning framework described above may be performed when the computer program is loaded into the RAM 603 and executed by the computing unit 601. Alternatively, in other embodiments, the computing unit 601 may be configured to perform the methods described in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, coupled to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. An operator registration method for a deep learning framework, the method comprising:
   receiving registration information provided by a user for registering operators with the deep learning framework, the registration information comprising: a custom calculation function, the custom calculation function being written in a manner irrelevant to the deep learning framework;
   building operator meta-information in the deep learning framework based on the registration information; and
   constructing a to-be-registered operator within the deep learning framework based on the operator meta-information, and registering the to-be-registered operator in a global operator table within the deep learning framework.

2. The method according to claim 1, wherein the registration information further comprises: custom input information and custom output information, and the step of building operator meta-information in the deep learning framework based on the registration information comprises:
   converting the custom input information into standard input information within the deep learning framework;
   converting the custom output information into standard output information within the deep learning framework;
   processing the custom calculation function by using macros, so as to obtain a calculation function after macro processing; and
   building the operator meta-information in the deep learning framework based on the standard input information, the standard output information and the calculation function after macro processing.

3. The method according to claim 2, wherein the to-be-registered operator comprises to-be-registered operator description information and a to-be-registered operator kernel function, and the step of constructing a to-be-registered operator within the deep learning framework based on the operator meta-information comprises:
   constructing the to-be-registered operator description information based on the standard input information and the standard output information; and
   constructing the to-be-registered operator kernel function based on the calculation function after macro processing.

4. The method according to claim 3, wherein the to-be-registered operator kernel function comprises unified-form input information and a unified function pointer, and the step of constructing the to-be-registered operator kernel function based on the calculation function after macro processing comprises:
   determining a structure for replacing the calculation function after macro processing, the structure comprising a static function, the static function having a unified form corresponding to different custom calculation functions;
   taking input information of the static function as the unified-form input information; and
   taking a function pointer of the static function as the unified function pointer.

5. The method according to claim 4, wherein the input information of the static function forms an input information list, the input information list comprises an input tensor list, the custom input information comprises custom input information of at least one data type, the structure comprises at least one specialized substructure, different specialized substructures correspond to different data types, the data type comprises tensors, and the step of constructing the to-be-registered operator kernel function based on the calculation function after macro processing further comprises:
   obtaining custom input information of the data types corresponding to the specialized substructures by using specialized substructures in the at least one specialized substructure;
   forming the input tensor list with the custom input information whose data type are tensors; and
   if the data type further comprises non-tensors and the input information list further comprises another data type list, forming the another data type list with the custom input information whose data type are non-tensors.

6. The method according to claim 1, wherein the step of constructing a to-be-registered operator within the deep learning framework based on the operator meta-information, and registering the to-be-registered operator in a global operator table within the deep learning framework comprises:
   determining a current constructor corresponding to a current scenario based on the current scenario; and
   constructing the to-be-registered operator within the deep learning framework based on the operator meta-information by using the current constructor, and registering the to-be-registered operator in the global operator table within the deep learning framework.

7. The method according to claim 2, wherein the step of constructing a to-be-registered operator within the deep learning framework based on the operator meta-information, and registering the to-be-registered operator in a global operator table within the deep learning framework comprises:
   determining a current constructor corresponding to a current scenario based on the current scenario; and
   constructing the to-be-registered operator within the deep learning framework based on the operator meta-information by using the current constructor, and registering the to-be-registered operator in the global operator table within the deep learning framework.

8. The method according to claim 3, wherein the step of constructing a to-be-registered operator within the deep learning framework based on the operator meta-information, and registering the to-be-registered operator in a global operator table within the deep learning framework comprises:
   determining a current constructor corresponding to a current scenario based on the current scenario; and
   constructing the to-be-registered operator within the deep learning framework based on the operator meta-information by using the current constructor, and registering the to-be-registered operator in the global operator table within the deep learning framework.

9. The method according to claim 4, wherein the step of constructing a to-be-registered operator within the deep learning framework based on the operator meta-information, and registering the to-be-registered operator in a global operator table within the deep learning framework comprises:
determining a current constructor corresponding to a current scenario based on the current scenario; and
constructing the to-be-registered operator within the deep learning framework based on the operator meta-information by using the current constructor, and registering the to-be-registered operator in the global operator table within the deep learning framework.

10. The method according to claim 5, wherein the step of constructing a to-be-registered operator within the deep learning framework based on the operator meta-information, and registering the to-be-registered operator in a global operator table within the deep learning framework comprises:
determining a current constructor corresponding to a current scenario based on the current scenario; and
constructing the to-be-registered operator within the deep learning framework based on the operator meta-information by using the current constructor, and registering the to-be-registered operator in the global operator table within the deep learning framework.

11. An electronic device, comprising:
at least one processor; and
a memory communicatively connected with the at least one processor;
wherein the memory stores instructions executable by the at least one processor, and the instructions are executed by the at least one processor to enable the at least one processor to perform an operator registration method for a deep learning framework, wherein the method comprises:
receiving registration information provided by a user for registering operators with the deep learning framework, the registration information comprising: a custom calculation function, the custom calculation function being written in a manner irrelevant to the deep learning framework;
building operator meta-information in the deep learning framework based on the registration information; and
constructing a to-be-registered operator within the deep learning framework based on the operator meta-information, and registering the to-be-registered operator in a global operator table within the deep learning framework.

12. The electronic device according to claim 11, wherein the registration information further comprises: custom input information and custom output information, and the step of building operator meta-information in the deep learning framework based on the registration information comprises:
converting the custom input information into standard input information within the deep learning framework;
converting the custom output information into standard output information within the deep learning framework;
processing the custom calculation function by using macros, so as to obtain a calculation function after macro processing; and
building the operator meta-information in the deep learning framework based on the standard input information, the standard output information and the calculation function after macro processing.

13. The electronic device according to claim 12, wherein the to-be-registered operator comprises to-be-registered operator description information and a to-be-registered operator kernel function, and the step of constructing a to-be-registered operator within the deep learning framework based on the operator meta-information comprises:
constructing the to-be-registered operator description information based on the standard input information and the standard output information; and
constructing the to-be-registered operator kernel function based on the calculation function after macro processing.

14. The electronic device according to claim 13, wherein the to-be-registered operator kernel function comprises unified-form input information and a unified function pointer, and the step of constructing the to-be-registered operator kernel function based on the calculation function after macro processing comprises:
determining a structure for replacing the calculation function after macro processing, the structure comprising a static function, the static function having a unified form corresponding to different custom calculation functions;
taking input information of the static function as the unified-form input information; and
taking a function pointer of the static function as the unified function pointer.

15. The electronic device according to claim 14, wherein the input information of the static function forms an input information list, the input information list comprises an input tensor list, the custom input information comprises custom input information of at least one data type, the structure comprises at least one specialized substructure, different specialized substructures correspond to different data types, the data type comprises tensors, and the step of constructing the to-be-registered operator kernel function based on the calculation function after macro processing further comprises:
obtaining custom input information of the data types corresponding to the specialized substructures by using specialized substructures in the at least one specialized substructure;
forming the input tensor list with the custom input information whose data type are tensors; and
if the data type further comprises non-tensors and the input information list further comprises another data type list, forming the another data type list with the custom input information whose data type are non-tensors.

16. The electronic device according to claim 11, wherein the step of constructing a to-be-registered operator within the deep learning framework based on the operator meta-information, and registering the to-be-registered operator in a global operator table within the deep learning framework comprises:
determining a current constructor corresponding to a current scenario based on the current scenario; and
constructing the to-be-registered operator within the deep learning framework based on the operator meta-information by using the current constructor, and registering the to-be-registered operator in the global operator table within the deep learning framework.

17. The electronic device according to claim 12, wherein the step of constructing a to-be-registered operator within the deep learning framework based on the operator meta-information, and registering the to-be-registered operator in a global operator table within the deep learning framework comprises:

determining a current constructor corresponding to a current scenario based on the current scenario; and constructing the to-be-registered operator within the deep learning framework based on the operator meta-information by using the current constructor, and registering the to-be-registered operator in the global operator table within the deep learning framework.

18. The electronic device according to claim 13, wherein the step of constructing a to-be-registered operator within the deep learning framework based on the operator meta-information, and registering the to-be-registered operator in a global operator table within the deep learning framework comprises:

determining a current constructor corresponding to a current scenario based on the current scenario; and constructing the to-be-registered operator within the deep learning framework based on the operator meta-information by using the current constructor, and registering the to-be-registered operator in the global operator table within the deep learning framework.

19. The electronic device according to claim 14, wherein the step of constructing a to-be-registered operator within the deep learning framework based on the operator meta-information, and registering the to-be-registered operator in a global operator table within the deep learning framework comprises:

determining a current constructor corresponding to a current scenario based on the current scenario; and constructing the to-be-registered operator within the deep learning framework based on the operator meta-information by using the current constructor, and registering the to-be-registered operator in the global operator table within the deep learning framework.

20. A non-transitory computer readable storage medium with computer instructions stored thereon, wherein the computer instructions are used for causing a computer to perform an operator registration method for a deep learning framework, wherein the method comprises:

receiving registration information provided by a user for registering operators with the deep learning framework, the registration information comprising: a custom calculation function, the custom calculation function being written in a manner irrelevant to the deep learning framework;

building operator meta-information in the deep learning framework based on the registration information; and constructing a to-be-registered operator within the deep learning framework based on the operator meta-information, and registering the to-be-registered operator in a global operator table within the deep learning framework.

\* \* \* \* \*